United States Patent [19]

Fukumi et al.

[11] 3,859,342

[45] Jan. 7, 1975

[54] PROCESS FOR THE PREPARATION OF P-AMINOMETHYLBENZOIC ACID

[75] Inventors: Hirokazu Fukumi, Ooimachi; Hirataka Itoh, Tsuruma; Koryo Itoh; Yutaka Usubuchi, both of Tokyo, all of Japan

[73] Assignee: Asahi Kasei Kogyo Kabushiki Kaisha, Osaka, Japan

[22] Filed: Apr. 27, 1973

[21] Appl. No.: 355,048

[52] U.S. Cl. ............................................. 260/518 R
[51] Int. Cl. ........................................ C07c 101/42
[58] Field of Search ................................ 260/518 R

[56] References Cited
OTHER PUBLICATIONS

Levine, M. et al., J. Organic Chemistry, Vol. 24, (1959), QD24156, pages 115-116 relied on.

Finak, I. L., Organic Chemistry, Vol. 1, (1963), Pub. by R. Clay-Great Britian (QD251F56), p. 191 relied on.

Primary Examiner—Lorraine A. Weinberger
Assistant Examiner—L. A. Thaxton
Attorney, Agent, or Firm—Cooper, Dunham, Clark, Griffin & Moran

[57] ABSTRACT

Process for the preparation of p-aminomethylbenzoic acid from an alkyl ester of p-cyanobenzoic acid in one step in high yield. The process comprises reacting an alkyl ester of p-cyanobenzoic acid with hydrogen in the presence of a hydrogenation catalyst in an aqueous medium containing at least one alkaline reagent.

12 Claims, No Drawings

PROCESS FOR THE PREPARATION OF P-AMINOMETHYLBENZOIC ACID

BACKGROUND OF THE INVENTION

This invention relates to a process for preparing p-aminomethylbenzoic acid from an alkyl ester of p-cyanobenzoic acid in one step.

p-Aminomethylbenzoic acid is useful as a modifier of fibers, a starting material for preparing polymers and an intermediate for preparing drugs such as trans-4-(aminomethyl) cyclohexane carboxylic acid.

According to the report by M. Levine and et al. (Journal of Organic Chemistry, vol. 24, pp.115 – 116) m- and p-aminomethylbenzoic acid is produced by reduction of m- and p-cyanobenzoic acid with Raney cobalt in an aqueous ammonia. However, there have been developed no commercially satisfactory procedures capable of preparing p- and m-cyanobenzoic acid, the starting material.

Japanese Patent Publication No. 18818/1966 describes an ecomical and easy procedure for the preparation of esters of p-cyanobenzoic acid from petrochemical starting materials by exchange reaction between a diester of an aromatic carboxylic acid and an aromatic dinitrile.

The preparation of p-aminomethylbenzoic acid from esters of p-cyanobenzoic acid requires two steps, and one is hydrolysis and the other is hydrogenation of the cyano group. When the hydrolysis is carried out prior to the hydrogenation, the cyano group is also hydrolyzed and yield of p-aminomethylbenzoic acid is decreased. In order to increase yields the reaction conditions such as the amount of a hydrolyzing agent, the period of reaction and the temperature of reaction should be carefully chosen. Futhermore, the hydrogenation of p-cyanobenzoic acid to give p-aminomethylbenzoic acid takes about 3 hours even with the use of a highly active Raney catalyst such as Raney cobalt W-6 or W-7. On the other hand, when the hydrogenation is carried out prior to the hydrolysis, the ester of p-aminomethylbenzoic acid which is produced as an intermediate becomes undesired insoluble byproducts under heating due to side reaction such as amidation of the esters. Thus, yields of p-aminomethylbenzoic acid are also decreased.

THE INVENTION

It has now been discovered in accordance with this invention that p-aminomethylbenzoic acid can be prepared in one step with high yield by reacting an alkyl ester of p-cyanobenzoic acid with hydrogen in the presence of a hydrogenation catalyst in an aqueous medium containing at least one alkaline reagent.

The alkyl esters of p-cyanobenzoic acid which may be employed as the starting materials in this invention may be represented by the formula,

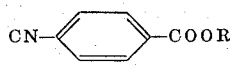

wherein R is an alkyl group having one to four carbon atoms. The alkyl group may be either straight or branch chained and includes methyl, ethyl, n-propyl, isopropyl, n-butyl, isobutyl, sec-butyl and tert-butyl groups.

Exemplary alkaline reagents include hydroxides, oxides and carbonates of alkali metals such as lithium hydroxide, sodium hydroxide, potassium hydroxide, lithium oxide, sodium oxide, potassium oxide, lithium carbonate, sodium carbonate and potassium carbonate; hydroxides and oxides of alkali earth metals such as magnesium hydroxide, calcium hydroxides, barium hydroxide, magnesium oxide, calcium oxide and barium oxide; and ammonia. Mixtures of these compounds may also be employed.

The amount of the alkaline reagents is at least sufficient to provide one gram equivalent of the metallic ion or ammonium ion for each mole of the alkyl ester of p-cyanobenzoic acid. When ammonia is employed, the preferred amount is to provide from about 4 to about 15 gram equivalent of ammonium ion for each mole of the alkyl ester of p-cyanobenzoic acid. When other alkaline reagents than ammonia are employed, the preferred amount is to provide from about 1 to about 2 gram equivalent of the metallic ion for each mole of the alkyl ester of p-cyanobenzoic acid. When ammonia is employed, the concentration of ammonia in an aqueous medium is typically from about 3 to 30 percent by weight. When other alkaline reagents than ammonia are employed, the concentration of the alkaline reagents in an aqueous medium is preferably from about 0.1 to 5 N and more preferably from about 0.2 to 2 N.

The hydrogenation catalysts which may be employed in the present invention include any conventional hydrogenation catalysts capable of hydrogenating a cyano group without causing deactivation of the catalyst in an aqueous alkaline medium.

Examplary hydrogenation catalysts include Raney metal catalysts such as developed Raney nickels including W-1, W-2, W-3, W-4, W-5, W-6, W-7 and W-8, developed Raney cobalts including W-1, W-2, W-3, W-4, W-5, W-6, W-7 and W-8; nickel catalysts such as reduced nickel, Urushibara nickel catalyst; Raney nickels and Raney cobalts which are used in the developed form; ruthenium oxide and rhodium oxide; and ruthenium metal and rhodium metal. The ruthenium and rhodium metals are typically supported on an inert substance such as active carbon, alumina, silica gel, diatomaceous earth, terra abla and pumice. The reduced nickel are typically supported on an inert substance such as alumina, silica gel, diatomaceous earth, terra abla and pumice. Mixtures of the hydrogenation catalysts may also be employed. Those skilled in the art, however, will recognize that the hydrogenation catalysts mentioned are only illustrative and that a wide variety of other hydrogenation catalysts may be equally effective.

The hydrogenation catalysts are employed in catalytic quantities. The amounts employed typically vary from about 0.1 to about 50 weight percent based on the weight of the alkyl ester of p-cyanobenzoic acid.

The period of reaction may vary within wide limits depending upon such factors as the temperature and pressure selected, the catalyst chosen, the amount of catalyst employed, the ester being reduced and other factors. Generally, however, it has been found that the reaction periods of from 30 minutes to 5 hours are sufficient.

While the reaction can be carried out at atmospheric pressure, it is generally advisable to utilize a pressure above atmospheric, even as higher as 150 atmospheres or higher. The optimum range from the point of view of coupling acceptable yields with the cost of equipment is from about 20 to about 100 atmospheres.

The reaction temperature is typically in the range of from about 10°C to 200°C., and the preferred range is from about 50°C to about 150°C. in consideration of rates of saponification of the ester group of p-cyanobenzoic acid and yield.

The amount of hydrogen is sufficient to hydrogenate the cyano group, and generally more than two moles of hydrogen are utilized for the purpose of efficient conversion.

The reaction may typically be carried out in a closed vessel preferably with stirring.

p-Aminomethylbenzoic acid may be obtained by removing the catalyst used from the reaction mixture by filtration, neutralizing the filtrate with a mineral acid such as hydrochloric acid and sulfuric acid, filtering the precipitates formed and drying the precipitates, or by removing the catalyst used from the reaction mixture by filtration, removing the alcohol produced or together with ammonia, if used as an alkaline reagent from the filtrate, treating the resulting aqueous solution with ion exchange resins such as strongly acidic cation exchange resins and concentrating the treated solution.

When ammonia is employed as an alkaline reagent, the catalyst used is removed from the reaction mixture by filtration and the filtrate is concentrated to produce crystals of p-aminomethylbenzoic acid.

The reaction of this invention can be carried out either batchwise or in a continuous manner.

The following, non-limiting examples are given by way of illustration only.

EXAMPLE 1

In a 300 ml. stainless steel autoclave equipped with a stirrer there were charged 20g. of methyl ester of p-cyanobenzoic acid, 62 ml. of a 2 N aqueous sodium hydroxide solution and 1g. of developed Raney nickel ("NDHT 90", made by Kawaken Fine Chemical Co., Ltd.) and then hydrogen was introduced thereto until the hydrogen pressure reached 40 atms. The autoclave was heated to 50°C. with stirring and stirring was continued for 2 hours at 50°C. After cooling the autoclave the crude reaction mixture was taken out and the catalyst was filtered off. The filtrate was neutralized by hydrochloric acid to give precipitates and the precipitates were collected and dried to give 15.2g. of crystals having a melting point of from 346°C. to 349°C. These crystals were identified with p-aminomethylbenzoic acid by infra red absorption spectrum and nuclear magnetic resonance spectrum.

EXAMPLE 2

In a 300 ml. stainless steel autoclave equipped with stirrer there were charged 21.7g. of ethyl ester of p-cyanobenzoic acid, 50 ml. of a 25% aqueous ammonia solution, 1.0g. of developed Raney cobalt ("OFT 90", made by Kawaken Fine Chemical Co., Ltd.) and 2.97g. of lithium hydroxide and then hydrogen was introduced thereto until the hydrogen pressure reached 60 atms. The atuoclave was heated to 70°C. with stirring and stirring was continued for one hour at 70°C. After cooling the autoclave, the reaction mixture was taken out and the catalyst was filtered off. Then, ammonia and ethanol was distilled off from the filtrate and the remaining aqueous solution was passed through a tube packed with 100 ml. of ion exchange resins ("H-type Amberlite", made by Rohm & Haas Co.) and the ion exchange resins were washed with 300 ml. of a 1 N aqueous ammonia solution. The passed solution and the washed solution were all together condensed to give 17.4g. of white crystals. These crystals were identified with p-aminomethylbenzoic acid by the same method as in Example 1.

EXAMPLE 3

In a 100 ml. stainless steel autoclave equipped with a stirrer there were charged 7.57g. of n-propyl ester of p-cyanobenzoic acid, 0.15g. of ruthenium oxide, 3.08g. of barium hydroxide and 30 ml. of a 28% aqueous ammonia solution and then hydrogen was introduced thereto until the hydrogen pressure reached 100 atms. The autoclave was heated to 90°C. with stirring and stirring was continued for 30 minutes at 90°C. After cooling the autoclave, the reaction mixture was taken out and the catalyst was filtered off. The filtrate was neutralized with hydrochloric acid to give precipitates and the resulting precipitates were collected and dried to give 4.65g. of white crystals. These crystals were identified with those of Example 1 by analysis.

EXAMPLE 4

In a 100 ml. stainless steel autoclave equipped with a stirrer there were charged 6.45g. of methyl ester of p-cyanobenzoic acid, 0.05g. of ruthenium metal supported on 1.0g. of active carbon, 1.2g. of magnesium oxide and 30 ml. of a 25% aqueous ammonia solution and then hydrogen was introduced thereto until the hydrogen pressure reached 100 atms. The autoclave was heated to 90°C. with stirring and stirring was continued for 30 minutes at 90°C. After cooling the autoclave, the reaction mixture was taken out and the catalyst was filtered off and the filtrate was treated in the same manner as in Example 3 to give 5.0g. of white crystals. These crystals were identified with those of Example 1 by analysis.

EXAMPLE 5

In a 100 ml. stainless steel autoclave equipped with a stirrer there were charged 7.0g. of ethyl ester of p-cyanobenzoic acid, 0.1g. of rhodium metal supported on 1.0g. of silica gel and 40 ml. of a 25% aqueous ammonia solution and then hydrogen was introduced thereto until the hydrogen pressure reached 100 atms. The autoclave was heated to 90°C. with stirring and stirring was continued for 30 minutes at 90°C. After cooling the autoclave, the reaction mixture was taken out and the catalyst was filtered off. The filtrate was condensed to give 5.25g. of white crystals. These crystals were identified with those of Example 1 by analysis.

EXAMPLE 6

In a 100 ml. stainless steel autoclave there were charged 6.45g. of methyl ester of p-cyanobenzoic acid, 0.15g. of rhodium oxide and 30 ml. of a 28% aqueous ammonia solution and then hydrogen was introduced thereto until the hydrogen pressure reached 80 atms. The autoclave was heated to 80°C. with stirring and stirring was continued for one hour. After cooling the autoclave, the reaction mixture was taken out and the catalyst was filtered off. The filtrate was treated in the same manner as in Example 2 to give 4.6g. of white crystals. These crystals were identified with those of Example 1 by analysis.

EXAMPLE 7

In a 100 ml. stainless steel autoclave there were charged 6.45g. of methyl ester of p-cyanobenzoic acid, 30 ml. of a 28% aqueous ammonia solution and 0.6g. of the same developed Raney cobalt as in Example 2 and then hydrogen was introduced thereto until the hydrogen pressure reached 8 atms. When the autoclave was heated to 50°C. with stirring, the absorption of hydrogen started and stirring was continued for 3 hours at 50°C. while feeding hydrogen thereto. After cooling the autoclave, the reaction mixture was taken out and the catalyst was filtered off. The filtrate was treated in the same manner as in Example 2 to give 5.4g. of white crystals. These crystals were identified with those of Example 1 by analysis.

for 1 hour at 70°C. After cooling the autoclave, the reaction mixture was taken out and the catalyst was removed by filtration. The filtrate was neutralized with 2 N sulfuric acid to give precipitates and the resulting precipitates were collected and dried to give 5.3g. of white crystals. These crystals were identified with those of Example 1 by analysis.

EXAMPLE 10 to 21

Example 3 was repeated except that a variety of alkyl esters of p-cyanobenzoic acid, alkaline reagents and hydrogenation catalysts set forth in Table were employed instead of the n-propyl ester of p-cyanobenzoic acid, the barium hydroxide and the aqueous ammonia solution. The results are shown in Table.

TABLE

| Ex. No. | (g.) | Alkaline reagent | Hydrogenation catalyst (g.) | Yield g. | Percent |
|---|---|---|---|---|---|
| 10 | R: tert-Butyl (8.12) | 10% aqueous NH₃ (30 ml.) / NaOH (1.6 g.) | Developed Raney Ni* (1.6) | 5.1 | 85 |
| 11 | R: Isopropyl (7.56) | 10% aqueous NH₃ (30 ml.) / NaOH (1.6 g.) | do | 5.2 | 89 |
| 12 | R: sec-Butyl (8.12) | 2N KOH (30 ml.) | do | 4.6 | 76 |
| 13 | R: Ethyl (7.0) | H₂O (30 ml.) / Li₂O (0.6 g.) | do | 4.51 | 75 |
| 14 | do | H₂O (30 ml.) / BaO (1.53 g.) / Na₂O (0.62 g.) | Developed Raney Ni* (1.4) | 4.54 | 75 |
| 15 | do | 12% aqueous NH₃ (30 ml.) / KOH (3.4 g.) | do | 5.30 | 88 |
| 16 | R: Methyl (6.45) | 12% aqueous NH₃ (30 ml.) / Li₂CO₃ (3.0 g.) | Reduced Ni** (2.5) | 5.36 | 87 |
| 17 | do | H₂O (30 ml.) / Ba(OH)₂·8H₂O (3.15 g.) / Na₂CO₃ (2.12 g.) | Developed Raney Ni* (1.3) | 4.46 | 74 |
| 18 | R: Methyl (6.45) | H₂O (30 ml.) / Li(OH) (0.48 g.) / K₂CO₃ (1.38 g.) | 0.1 g. of Ru metal supported on 1.0 g. of Al₂O₃ | 4.55 | 75 |
| 19 | do | 12% aqueous NH₃ (30 ml.) / KOH (1.12 g.) / Ca(OH)₂ (0.74 g.) | Developed Raney Ni* (1.3) | 5.30 | 88 |
| 20 | do | 28% aqueous NH₃ (30 ml.) / MgO (2.4 g.) | do | 4.60 | 76 |
| 21 | do | 12% aqueous NH₃ (30 ml.) / CaO (1.12 g.) | do | 4.97 | 82 |

*Developed Raney Ni was the same as in Example 1.
**Reduced Ni was prepared by calcining nickel nitrate in a melting pot at a temperature of from 500° C. to 550° C. to give nickel oxide, supporting the nickel oxide on diatomaceous earth at a weight ratio of 1:1 and reducing the resulting nickel oxide in a stream of hydrogen at 300° C.

EXAMPLE 8

In a 100 ml. Erlenmeyer flask there were charged 1.0g. of methyl ester of p-cyanobenzoic acid, 30 ml. of a 28% aqueous ammonia solution and 0.5g. of Raney nickel (W-7) developed under a pressure of hydrogen and then hydrogen was introduced thereto under atmospheric pressure with stirring by a magnetic stirrer. The absorption of hydrogen was completed for 3 hours and the amount of hydrogen absorbed was 270 ml. After removing the catalyst by filtration from the resulting reaction mixture, the filtrate was treated in the same manner as in Example 2 to give 0.85g. of white crystals. These crystals were identified with those of Example 1 by analysis.

EXAMPLE 9

In a 100 ml. stainless steel autoclave equipped with a stirrer there were charged 8.12g. of n-butyl ester of p-cyanobenzoic acid, 30 ml. of a 10% aqueous ammonia solution, 1.6g. of sodium hydroxide and 1.6g. of the same developed Raney nickel as in Example 1, and then hydrogen was introduced thereto until the hydrogen pressure reached 80 atms. The autoclave was heated to 70°C. with stirring and stirring was continued

What is claimed is:

1. A process for preparing p-aminomethylbenzoic acid in one step which comprises reacting an alkyl ester of p-cyanobenzoic acid of the formula,

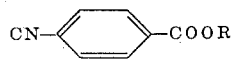

wherein R represents an alkyl group having one to four carbon atoms, at a temperature of from about 10°C. to 200°C. with hydrogen in the presence of a hydrogenation catalyst in an aqueous medium containing at least one alkaline reagent selected from the group consisting of hydroxides, oxides and carbonates of alkali metals; hydroxides and oxides of alkali earth metals; and ammonia, the amount of said alkaline reagent or ammonia being at least sufficient to provide one gram equivalent of metallic ion or ammonium ion for each mole of said alkyl ester of p-cyanobenzoic acid.

2. A process according to claim 1 wherein said alkyl ester of p-cyanobenzoic acid is selected from the group of consisting of methyl, ethyl, n-propyl, isopropyl, n-butyl, isobutyl and tert-butyl esters of p-cyanobenzoic acid.

3. A process according to claim 2 wherein said alkyl ester of p-cyanobenzoic acid is methyl ester of p-cyanobenzoic acid.

4. A process according to claim 1 wherein the reaction temperature is from about 50°C. to about 150°C.

5. A process according to claim 1 wherein said alkaline reagent is selected from the group consisting of lithium hydroxide, sodium hydroxide, potassium hydroxide, lithium oxide, sodium oxide, potassium oxide, lithium carbonate, sodium carbonate, potassium carbonate, magnesium hydroxide, calcium hydroxide, barium hydroxide, magnesium oxide, calcium oxide and barium oxide.

6.. A process according to claim 5 wherein the amount of said alkaline reagent is to provide from about 1 to about 2 gram equivalent of the metallic ion for each mole of the alkyl ester of p-cyanobenzoic acid.

7. A process according to claim 1 wherein said alkaline reagent is ammonia.

8. A process according to claim 7 wherein the amount of said ammonia is to provide from about 4 to about 15 gram equivalent of ammonia ion for each mole of the alkyl ester of p-cyanobenzoic acid.

9. A process according to claim 7 wherein said alkaline reagent is a mixture of ammonia and sodium hydroxide.

10. A process according to claim 7 wherein said alkaline reagent is a mixture of ammonia and potassium hydroxide.

11. A process according to claim 1 wherein said hydrogenation catalyst is selected from the group consisting of Raney nickel, Raney cobalt, ruthenium oxide, rhodium oxide, ruthenium metal, rhodium metal and reduced nickel.

12. A process according to claim 1 wherein the amount of hydrogenation catalyst is from about 0.1 to about 50 weight percent based on the weight of alkyl ester of p-cyanobenzoic acid.

* * * * *